(12) United States Patent
Stone et al.

(10) Patent No.: US 12,440,626 B2
(45) Date of Patent: Oct. 14, 2025

(54) JOINT DISLOCATION REDUCTION DEVICE AND METHOD USING THE SAME

(71) Applicants: Kevin R. Stone, San Francisco, CA (US); Mark Joseph, Aspen, CO (US)

(72) Inventors: Kevin R. Stone, San Francisco, CA (US); Mark Joseph, Aspen, CO (US)

( * ) Notice: Subject to any disclaimer, the term of this patent is extended or adjusted under 35 U.S.C. 154(b) by 700 days.

(21) Appl. No.: 17/817,415

(22) Filed: Aug. 4, 2022

(65) Prior Publication Data

US 2023/0038147 A1 Feb. 9, 2023

Related U.S. Application Data

(60) Provisional application No. 63/259,699, filed on Aug. 4, 2021.

(51) Int. Cl.
*A61M 5/32* (2006.01)
*A61B 17/00* (2006.01)

(52) U.S. Cl.
CPC ..... *A61M 5/32* (2013.01); *A61B 2017/00867* (2013.01); *A61L 2400/16* (2013.01)

(58) Field of Classification Search
CPC ........... A61F 2/08; A61B 17/842; A61M 5/32
See application file for complete search history.

(56) References Cited

U.S. PATENT DOCUMENTS

| | | | | |
|---|---|---|---|---|
| 5,500,000 A | * | 3/1996 | Feagin | A61B 17/0401 606/220 |
| 2023/0181226 A1 | * | 6/2023 | Semingson | A61B 17/8863 606/263 |

FOREIGN PATENT DOCUMENTS

WO    WO-2016154550 A1 *   9/2016   ............. A61B 17/04

* cited by examiner

*Primary Examiner* — Dung T Ulsh
(74) *Attorney, Agent, or Firm* — Cozen O'Connor (57) ABSTRACT

A joint dislocation reduction device includes an elongated flexible ribbon-like band extending along a central axis from a proximal end to a tapered distal end. A distal end coupling element is disposed at the distal end. A proximal end coupling element is disposed at the proximal end. A cord extends from the tapered distal end to a needle. In a form, the band includes a flexible metallic ribbon disposed within a surrounding flexible, insulating coating element, wherein the band includes one or more resilient shape-memory regions between the proximal and distal ends. With the band under applied axial tension, the proximal end and distal end coupling elements are adapted to form a coupling assembly coupling the proximal and distal ends, forming a closed loop around a clavicle and a coracoid process with a single 180° twist, whereby the band rests flush against the clavicle and the coracoid process.

15 Claims, 7 Drawing Sheets

(180° TWIST)

JOINT DISLOCATION REDUCTION DEVICE AND METHOD USING THE SAME

RELATED APPLICATIONS

This application is a nonprovisional application which claims priority to U.S. Provisional Patent Application No. 63/259,699, filed Aug. 4, 2021, which is incorporated by reference into the present application in its entirety and for all purposes.

TECHNICAL FIELD OF THE INVENTION

The present invention relates to medical devices designed for use during surgery, by stabilizing positions of bones and adjacent joint tissue during surgical procedures and during subsequent healing.

BACKGROUND

The human acromioclavicular joint, commonly referred to as the "AC joint", is one of the joints that constitute the human shoulder complex. It is formed by the top part of the shoulder blade (the "acromion") and the collar bone (the "clavicle"). Ligaments are soft tissue structures that support the acromioclavicular joint and connect the collar bone down by attaching it to a bony bump of the shoulder blade (the "coracoid process").

Figure 1A:
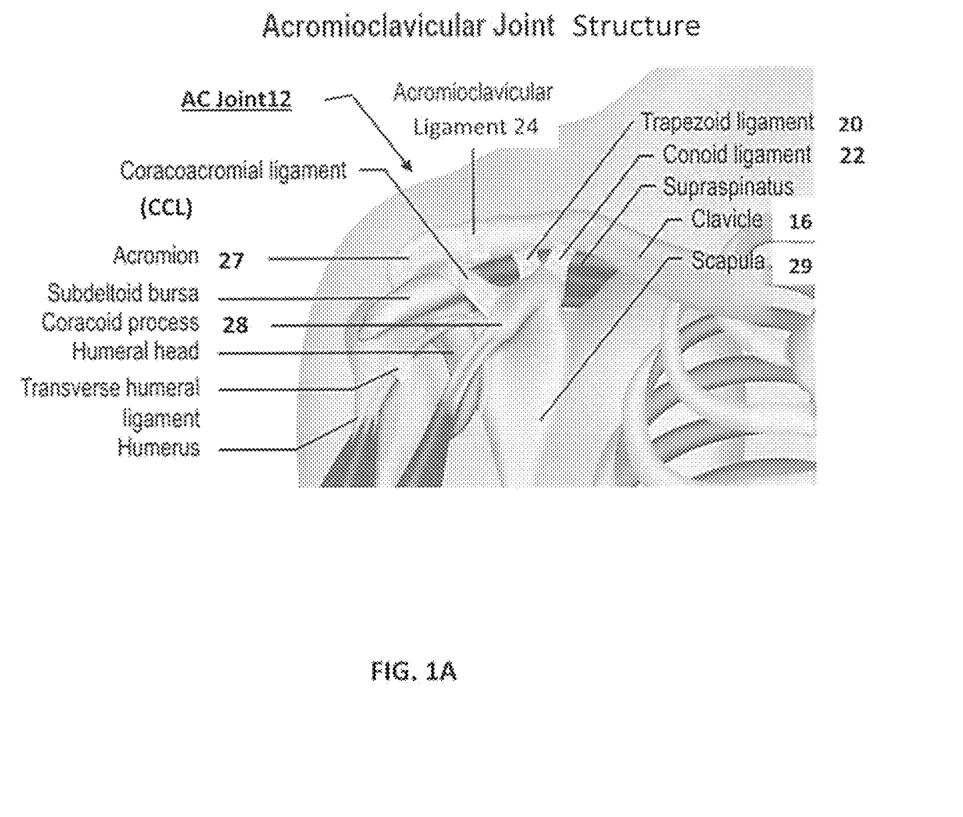
FIG. 1A shows the structure of an intact, undamaged shoulder.

Dislocated joints are of particular interest herein. The AC joint, a joint structure formed around a small gap (forming an almost-a-physical-"junction") between opposing ends of two elongated, generally horizontally extending bones in the shoulder, namely, the clavicle (or "collarbone") and the acromion which is a bone section which extends from the top part of the scapula, a relatively wide, flat bone lying on the thoracic wall (the "shoulder blade"). In an intact shoulder, as shown in FIG. 1A, a small gap between the opposing distal ends of the clavicle and the acromion, is spanned by an acromioclavicular (or AC) ligament. A ligament known as the coracoacromial ligament attaches the acromion to an upper portion of the scapula.

Again, in an intact shoulder, a coracoclavicular ligament formed by pair of nearly parallel and adjacent ligaments (the conoid ligament and the trapezoid ligament) attach the clavicle to an upper portion of the scapula. With all of the ligaments intact, as well as the supporting musculature, the shoulder is generally stable and performs a "normal" function.

Figure 1B:
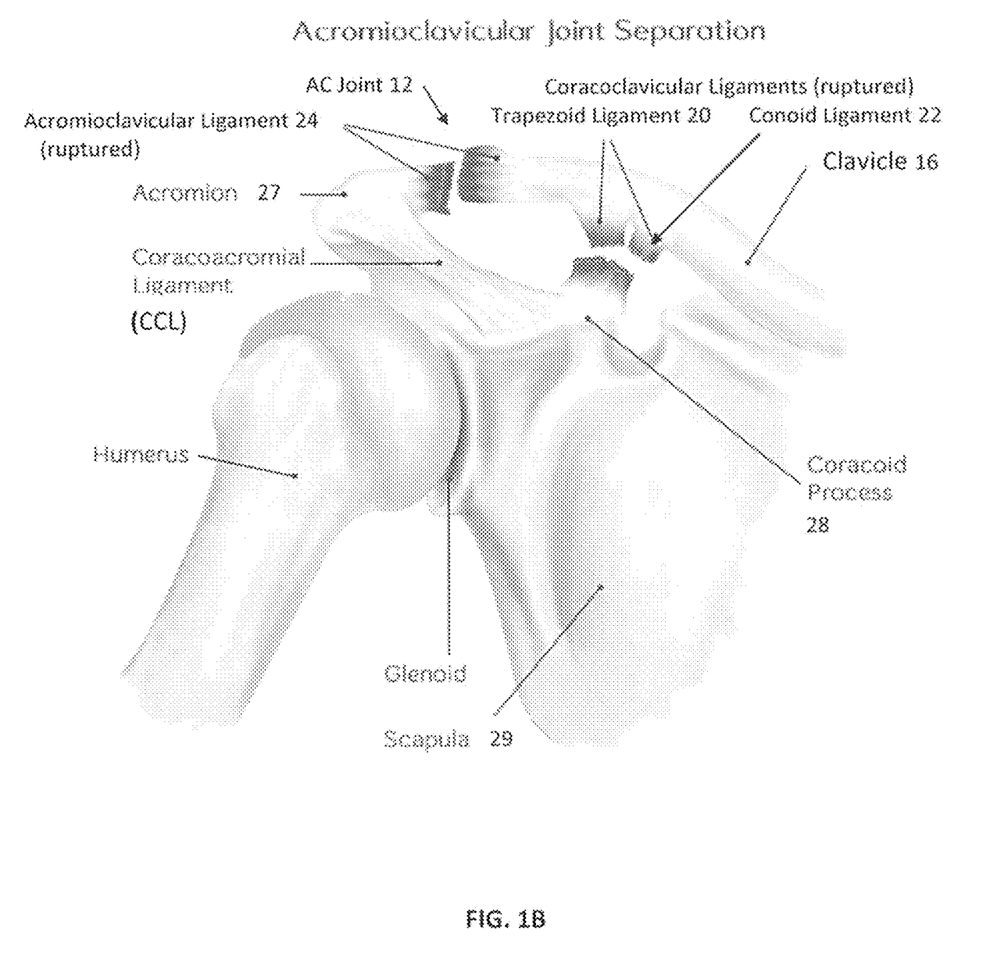
FIG. 1B shows the structure of a damaged, dislocated shoulder.

In a dislocated AC joint, as shown in FIG. 1B, for example, such as might occur pursuant to an injury during a vigorous sports activity, the AC ligament and the coracoclavicular ligament (likely including both the conoid ligament and the trapezoid ligament) typically rupture. When that occurs, a distal end of the clavicle which normally is held adjacent to the distal end of the acromion, breaks free and that end of the clavicle pivots "upward" from its normal, connected-by-the-AC-ligament to-the-acromion position. The affected shoulder no longer functions in a normal manner.

In order to repair the effects of such an injury, the clavicle must be aligned back to its normal position, with its distal end opposite the distal end of the acromion, and the three ruptured ligaments (conoid, trapezoid and AC ligament) must be repaired for long term success. The surgical procedures to effect the repair are difficult and, importantly, success requires that the distal ends of the clavicle and the acromion be substantially aligned during the healing period.

The acromion and clavicle bone sections of the overall AC joint structure are normally mechanically coupled, albeit separated. That mechanical coupling is effected by a resilient structure between opposing ends of the acromion and clavicle bone sections and held together by the AC ligament collectively forming the overall AC joint. Prior art surgical repair methods, with sutures, tapes, biological materials such as donor grafts, all fail to maintain adequate tension during healing, or cut through the bone due to their hardness. In accordance with the prior art, (1) sutures, and tapes, tissues have been wrapped around the tendon and bones at the dislocated joint, to effect reduction, or (2) screws have been drilled through the bones of joints to approximate them. None of those techniques reproduce the proper joint tension and maintenance of alignment without significant complications.

Among the difficulties encountered with the prior art techniques, hard materials or sutures cut through the bones and soft tissues when wrapped around those elements stretch out during normal shoulder motion in the rehabilitation stage after surgery. Screws and washers, when used, most often require a second surgery for their removal and often dislodge. These are all substantial disadvantages.

The subject invention utilizes a novel cable tie-like structure which permits improved joint reduction and maintenance of desired tension, effecting proper reduction during tissue healing.

DESCRIPTION

The structure of an intact, undamaged shoulder 8, including its acromioclavicular (AC) joint, 12 is shown in FIG. 1A. When such an AC joint is dislocated (or "separated"), as shown in FIG. 1B and indicated by reference number 14, typical changes in the structure include: (1) a distal end 16A of the clavicle 16 separates from the AC joint 12 and the clavicle 16 pivots upward with respect to its position in FIG. 1A, to the position shown in FIG. 1B, and (2) rupture occurs in at least one, and usually all, of the trapezoid ligament 20, the conoid ligament 22 and the acromioclavicular (AC) ligament 24 previously spanning the gap between the opposing ends of the acromion 27 and the clavicle 16, also as shown in FIG. 1B.

To repair the damage, and restore proper function to the shoulder, a surgical procedure is generally required. That procedure includes restoring the clavicle 16 to its normal position and joining the torn ends of the respective ruptured ligaments 20, 22, and 24.

While conventional practice has the shortcomings mentioned above, the subject invention provides a structure and method which overcomes at least a significant portion of the difficulties of conventional surgical repair processes.

Figure 2:
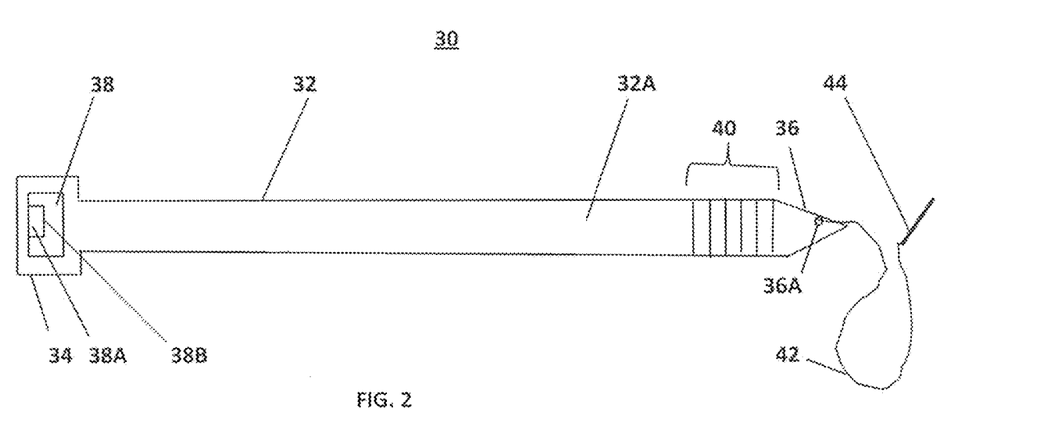
FIG. 2 shows a "modified cable tie"-like structure of the invention, prior to implantation.

In particular, a novel "modified cable tie"-like structure 30, exemplified by that shown in FIG. 2, is utilized to establish a desired, and near-normal, mutual orientation to the opposing distal ends of the acromion 27 and clavicle 16 and adjacent tissue of a dislocated AC joint 12 of FIG. 1B.

By way of example, FIG. 2 shows a top view of an exemplary modified cable tie-like structure 30 of the invention which is formed from an elongated band 32 of nylon (and preferably, Grilimide or Nylon 12), or hardened collagen, or a similar material, with a rectangle-like aperture 38 at a latch end 34 and an extended (and, preferably, tapered) lead end 36 opposite the latch end 34. A plurality of parallel ridges 40 are disposed on the top surface 32A of band 32, near the lead end 36, and extending transverse to a longitudinal axis of band 32. Aperture 38 includes a flexible latch portion 38A extending inward from the perimeter of aperture 38 to a lead edge 38B generally parallel to top surface 32A of band 32. Latch portion 38A is adapted to engage one of the ridges 40 as the lead end 36 passes through aperture 38, defining a closed loop formed by structure 30. Optimally, the material, and specific geometry, for band 32 is characterized by a coefficient of elasticity that matches (within ±25%) the net directional aggregate elasticity of the natural, undamaged acromioclavicular (AC), trapezoid and conoid ligaments of the human shoulder.

Figure 3:
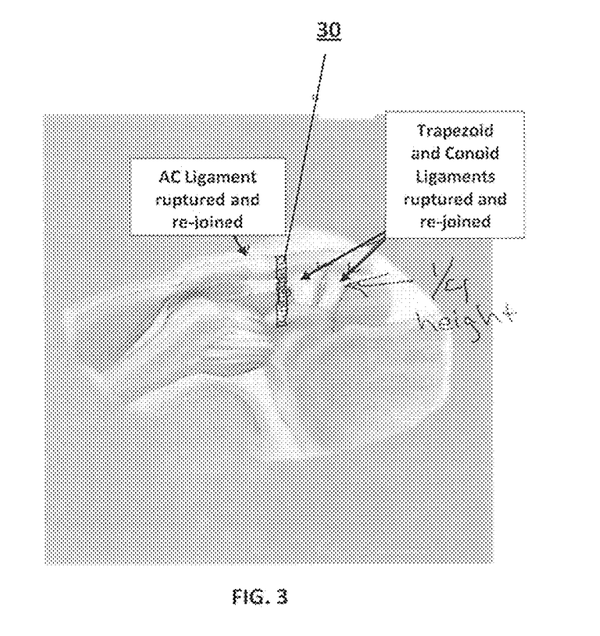
FIG. 3 shows a portion of an AC joint of a patient, with an implanted exemplar "modified cable tie"-like structure of the invention.

In a surgical repair procedure of the invention, the modified cable tie-like structure 30 is positioned to form an implanted closed loop, by drawing, under tension, the lead end 36 of structure 30 followed by band 32, around an angularly displaced distal portion of the clavicle and the coracoid process, as shown in FIG. 3, to and through the rectangular-like opening 38 at latch end 34, with latch portion 38A interferingly engaging one of ridges 40 to close the loop.

The coracoid process 28 is an osseous projection from the neck of the scapula, forming a small hook-like structure protruding from a lateral edge of the superior anterior portion of the scapula 29 (hence: coracoid, or "like a raven's beak").

In a normal shoulder 8, prior to an AC joint dislocation, the trapezoid and conoid ligaments 20 and 22 couple the coracoid process 28 to the clavicle 16 and the acromioclavicular (AC) ligament 24 mutually couple the opposed distal ends of the acromion 27 and the clavicle 16. As shown in FIG. 1B, following dislocation, generally all three of those ligaments rupture.

During the surgical repair procedure disclosed herein, as the lead end 36 of structure 30 passes above and around the clavicle and around an undersurface of the coracoid process, and to aperture 38 of latch end 34, to form the closed loop, the elongated band 32 is maintained under tension. As the loop is formed and tightened, that axially applied tension re-aligns the clavicle 16 with the acromion 27 substantially to their pre-dislocation positions. The biomechanical characteristics of the modified cable tie-like structure 30 effect a geometry and support structure for the acromion 27 and re-aligned clavicle 16 that substantially matches those of the pre-dislocated AC joint 12. As a result, during the healing process, the various elements of the AC joint 12 enable the shoulder to function in a manner close to that of an undamaged shoulder 8. In particular, the support structure provided by modified cable tie-like structure 30 is characterized by similar (within ±25%) strength and net directional aggregate elasticity characteristics to those provided by the trapezoid and conoid ligaments 20 and 22 and the acromioclavicular ligament 24 prior to the dislocation.

In summary, as lead end 16 of the modified cable tie-like structure 30 passes into and through the rectangular aperture 38, forming the closed loop, an edge of the latch portion 38A of rectangular aperture 38 engages one of the steps or ridges 40 near the lead end 16, locking the position of band 32 and preventing the lead end 36 from pulling back out of the rectangular aperture 38. Together, the locking mechanism established by the engagement of latch portion 38A and one of ridges 40, causes band 32 to form the closed loop extending around the clavicle and the coracoid. The forward-facing portion of the loop formed by modified cable tie-like structure 30, is shown in FIG. 3.

When the modified cable tie-like structure 30 is to be installed about the clavicle 16 and the coracoid of the dislocated joint, as shown in FIG. 3, the modified cable tie-like structure 30 is introduced by its tapered end 36, and pushed and/or pulled through and wrapped around the angularly displaced clavicle 16 and the coracoid process under applied tension so that their distal ends of the clavicle 16 and acromion 27 are restored to their proper alignment, the nearby ruptured ends of the respective trapezoid, conoid, and AC ligaments 20, 22 and 22 are re-joined (preferably, by suturing) to complete the repair. In time, the repaired ligaments are able to maintain the proper alignment, and normal function is restored.

In a preferred form, the modified cable tie-like structure 30 includes near its tapered lead end 16, a string, band or suture-like thread 24 extending from aperture 36A of lead end 36 with an optional (and preferably curved, but in some forms, straight) needle 44 at the distal end of thread 42. The needle 44 allows the surgeon to more easily pass (via pushing and/or pulling) the lead end 16 of the modified cable tie-like structure 30 around the clavicle and the coracoid to form the loop. As a consequence, as the lead end 16 of the band 32 is pushed and/or pulled (by the needle 24) through the rectangular aperture 38 of the locking mechanism, reduction in the anatomic misalignment of the clavicle and the acromion is achieved. The elasticity of the band of the modified cable tie-like structure 30 enables tension to be applied so that those bones remain substantially aligned while permitting some relative motion, for example, 0.5-2 mm or as much a 6 mm. Preferably, the elasticity of the band 32 is such that near "normal" shoulder motion is accommodated during the healing process. With the band 32 implanted, the range of motion allows inherent micro tension adjustment without substantial loss of position, during the healing process. That range depends in part on the cross-section dimensions of the band. An optimal characteristic for a band 32, is one which matches net of that from the ligaments with which it might supplant during the healing process. Offsets from a perfect match work as well, but in a degraded fashion.

In contrast to a "conventional cable tie", which is flexible, and thus adapted for wrapping around and holding cables together, the "modified cable tie"-like structure 30 of the invention, is not only flexible, for example like that of a conventional cable tie, but is also characterized by a desired elasticity. By way of example, a desired elasticity of the novel band 32 permits longitudinal stretching of the band 32 when it is under tension during installation around clavicle and the coracoid of the dislocated joint, for example an AC joint 12. The ability to apply axial tension (for example, as much as 70 Newtons) to the tightening band around the dislocated bones, without causing collateral damage to the bones or nearby tissue, is important. It allows achievement of an optimal, or near-optimal, anatomic alignment, with small patient-caused variations, and maintenance of an optimal, or near-optimal, relative position of those elements, during healing. This feature provides a key advantage over all prior art methods of effecting healing of a dislocated AC joint. The biomechanical properties of the novel "modified cable tie"-like structure with a distinct elasticity coefficient, when implanted at the dislocated joint, allows the joint to move within a defined range of motion without being over tensioned in a manner which might be detrimental to healing. The breadth and stiffness (reflecting resistance to compression in response to an applied force) of the material of the "modified cable tie"-like structure with its characteristic elasticity, enables the joint to move within a defined range of motion during healing, without being over tensioned, and without danger of the material of the band (due to its breadth and stiffness) to resist, or preferably fully avoid, cutting through the bone. A preferred, although not absolutely necessary, material for the band 32 is a recently developed type of nylon known as Grilamid nylon or the like. An important characteristic of Grilamid nylon as it might be used for band 32, is that, after axially stretching under applied tension, upon removal of the tension, its elasticity causes the band 32 to rapidly return to its length, or near that length, prior to the tension-induced stretching.

In summary, the advantages of the disclosed structure are:
A. use of a "modified cable tie"-like structure for effecting bone (and adjacent tissue) and joint reduction,
B. preferably there is a hole effected at the lead end 36 of the "modified cable tie"-like structure, which accommodates a length of elongated flexible material 42 attached to the lead end, allowing the surgeon to pull the lead end 36 around the bones and adjacent tissue during implantation, and
C. The "modified cable tie"-like structure 30 is composed of material like nylon (and preferably, but not exclusively, Grilamid nylon or Nylon 12 or the like), collagen, lactides, polyethylene and polypropylene characterized by elasticity in a desired range, as well as resistance to breakage under tension up to 70 Newtons.

By way of example, the modified cable tie-like structure 30 of FIG. 2, has a rectangular cross-section (transverse to its principal axis). The dimensions can be in the range 4.8 mm±10% wide and 1.4 mm±10% thick, with an overall length preferably on the order of 25 cm.

The stiffness (related to a coefficient of elasticity) of the material of the modified cable tie-like structure 30 is generally within the range of the net of the three likely-to-be-ruptured trapezoid ligament 20, conoid ligament 22 and acromioclavicular (AC) ligament 24, or the equivalent. Typical values for those ligaments are setforth in Table 1:

TABLE 1

|  | Intact CCL | Isolated Conoid | Isolated Trapezoid |
| --- | --- | --- | --- |
| Ultimate Load (N) | 500 +/− 134 | 394 +/− 170 | 440 +/− 118 |
| Yield Load (N) | 333 N (SEM*, 40 N) | n/a | n/a |
| Stiffness (N/mm) | 103 +/− 30 | 105 +/− 45 | 84 +/− 19 |

*SEM = standard error of the mean
Values ± 10% outside the respective ranges work as well although with reduced effect.

An exemplary embodiment of the "modified cable tie"-like structure 30 is shown in FIG. 2, prior to implantation. That exemplary structure 30 is shown in FIG. 3, implanted in a patient's AC joint 12.

In a preferred form, the ridged portion 40 of the structure 30 at a tapered lead end 36 (in common with a conventional cable tie structure) is adapted to engage the inside of a rectangular aperture 38 at the latch end 34 opposite the lead end 36 of the structure 30, (in common with a lock assembly of conventional cable tie structure). However, the modified cable tie-like structure disclosed herein, differs from conventional cable ties, particularly in that the modified cable tie-like structure 30 is characterized by a significantly greater "snap back" elasticity, whereby when stretched pursuant to applied tension and the, applied tension is removed, the "stretch" is reduced quickly, especially compared to conventional cable ties. That characteristic of the modified cable tie-like structure 30, which enables a combination of relative motion during patient recovery, is a primary factor in enabling satisfactory recovery following surgical repair of a dislocated AC joint.

Alternative joint dislocation reduction devices 50 are shown in FIGS. 6-11, including many of the features of the joint dislocation reduction device 30 of FIGS. 2-3, plus additional features. The particular exemplary alternative joint dislocation reduction device 50 of FIGS. 6-11 is shown and described in conjunction with an expanded view of an intact shoulder structure of FIG. 4 and an injured shoulder structure of FIG. 5. Device 50 is described in detail in conjunction with FIGS. 6A-11.

Figure 4:
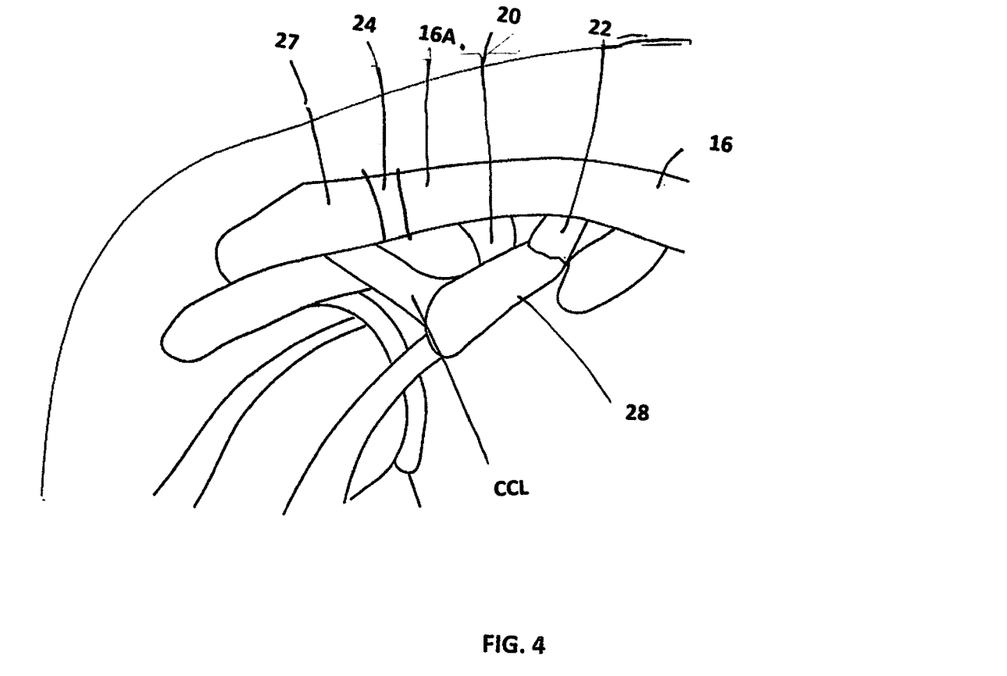
FIG. 4 shows a large-scale line drawing of the structure of an intact, undamaged shoulder.
Figure 5:
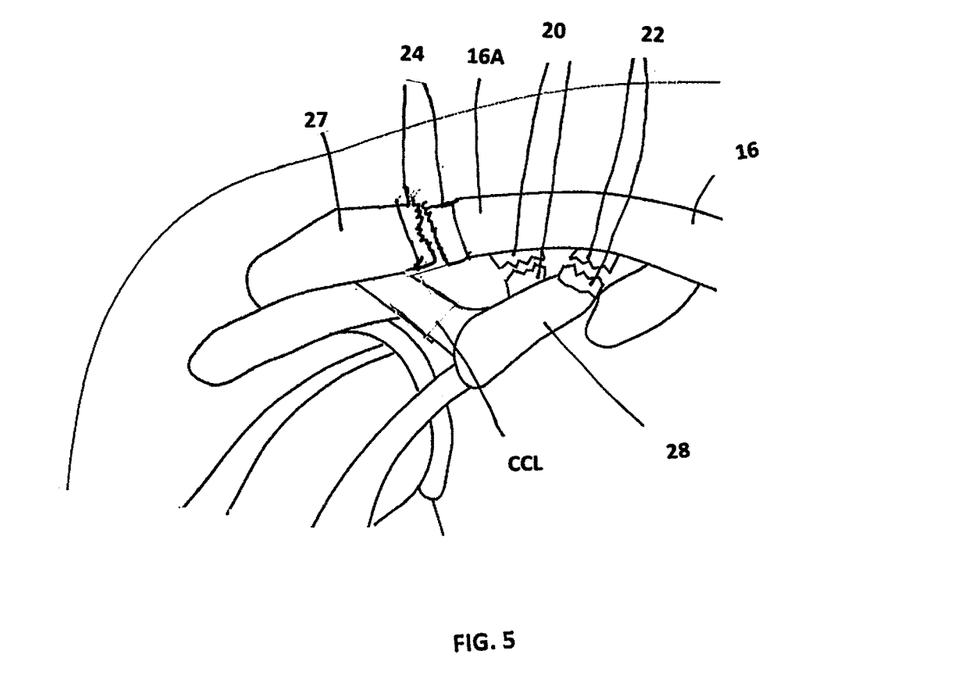
FIG. 5 shows a large-scale line drawing of the structure of a damaged, dislocated shoulder, including three ruptured ligaments.
Figure 6A:
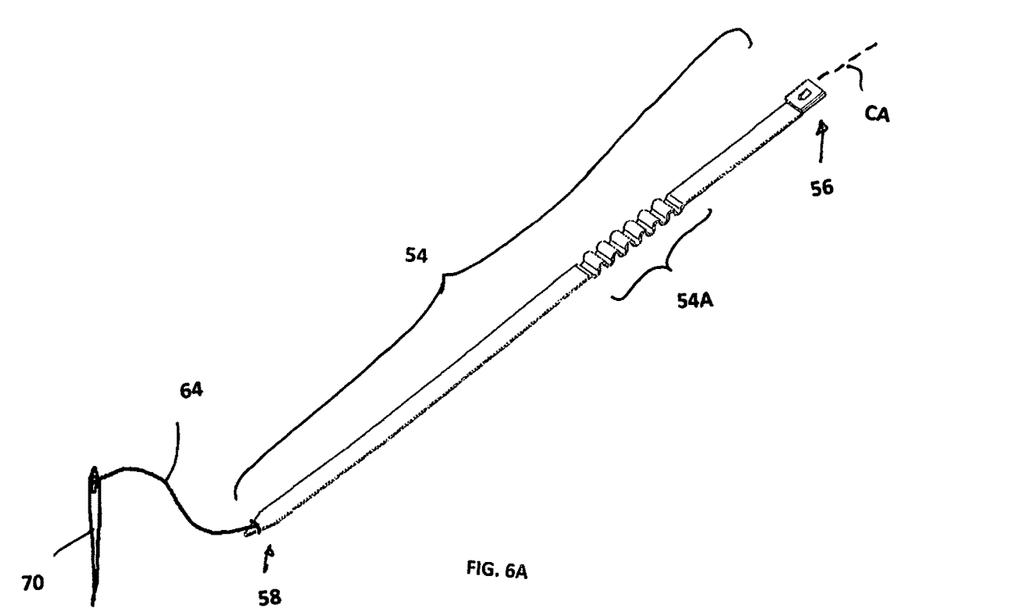
FIGS. 6A, 6B, 6C and 6D show an alternative form of a "modified cable tie"-like structure of the invention, prior to implantation, in an isometric view (with a needle and suture at the lead end), a side view (without a needle and suture at the lead end), a top view (without a needle and suture at the lead end) and a cross-section view, respectively.
Figure 6B:
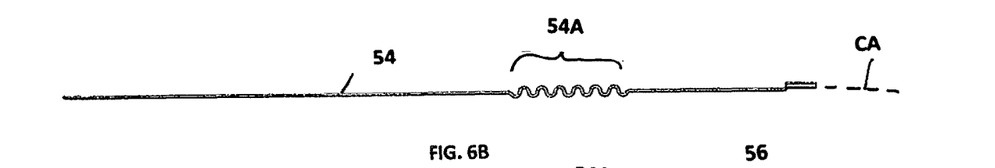
Figure 6C:
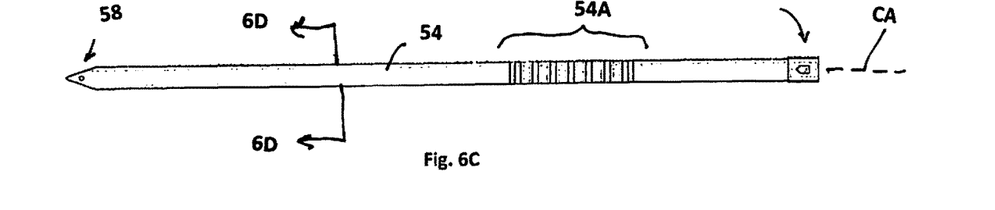
Figure 6D:
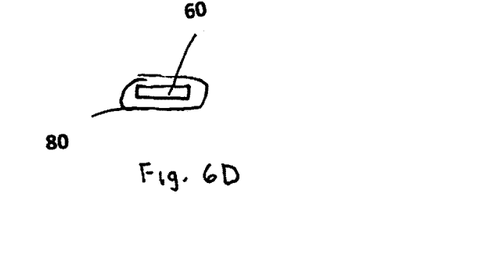
Figure 7:
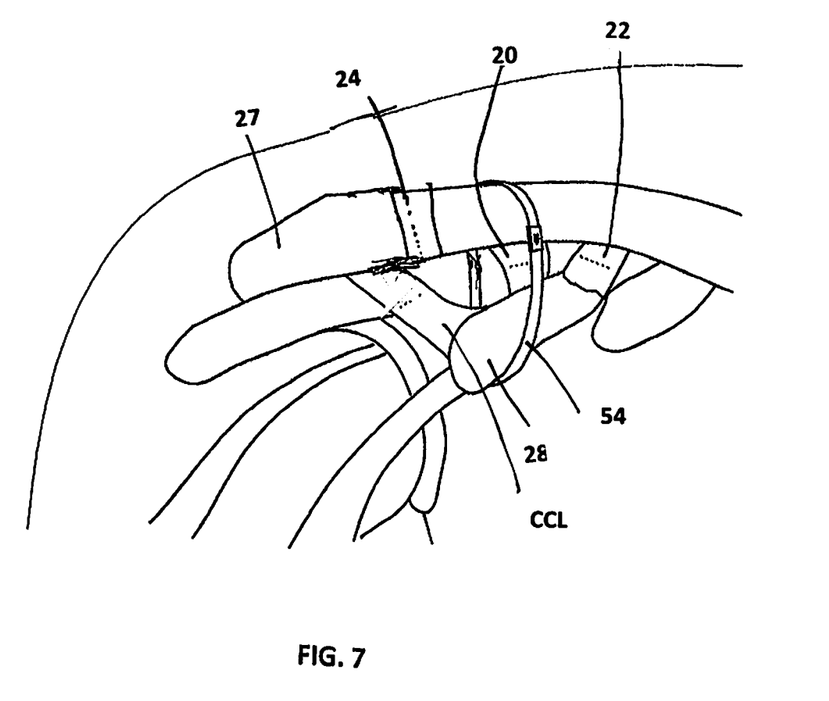
FIG. 7 shows the alternative "modified cable tie"-like structure of FIGS. 6A-6D in a "closed loop" disposed about body parts in the damaged shoulder of FIG. 2.

FIGS. 4 and 5 correspond to initial FIGS. 1A and 1B, where FIG. 4 represents an enlarged depiction of the intact Acromioclavicular Joint of FIG. 1, and FIG. 4 represents an enlarged depiction of the separated/injured Acromioclavicular Joint of FIG. 2. FIG. 7 represents an enlarged depiction of the separated/injured Acromioclavicular Joint of FIG. 2 after that joint has been surgically repaired using the devices and methods of the invention disclosed herein. The various tissues and bones of FIGS. 4, 5 and 7 are identified with the same reference designations as are the corresponding bones and tissues of FIGS. 1A and 1B.

FIGS. 6A-6D, 7 and 8 illustrate an alternative joint dislocation reduction device 50 which principally includes an elongated flexible band 54 extending along a central axis CA from a proximal end 56 to a distal end 58. The band 54 comprises a ribbon-like metallic core 60 (with a length in the range 150 to 250 mm and preferably having a rectangular cross-section extending transverse to the central axis CA). Preferably, the rectangular cross-section of band 54, including the covering 80, is 0.75 to 1.5 mm×4 to 7 mm×6 mm±20%. Band 54 is preferably constructed of spring stainless steel, although other materials may be used such as titanium, steel, spring steel, and other metals. The distal end 58 is tapered and includes, extending therefrom, a cord 64, or drawstring, terminating in a curved or straight needle-like structure 70.

Figure 9:
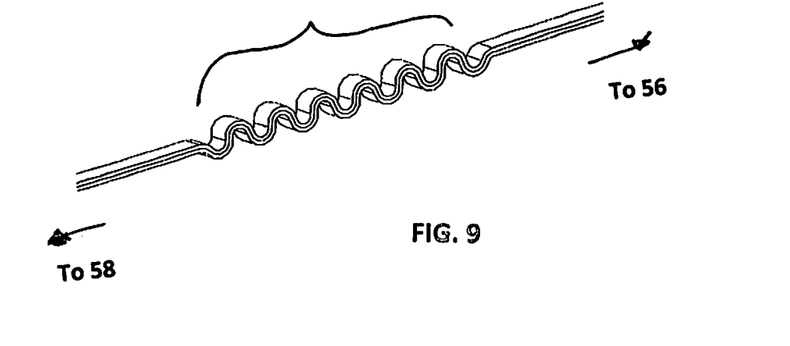
FIG. 9 shows an exemplary resilient spring element in the band of the "modified cable tie"-like structure of FIGS. 6A-6D.
Figures 10, 11:
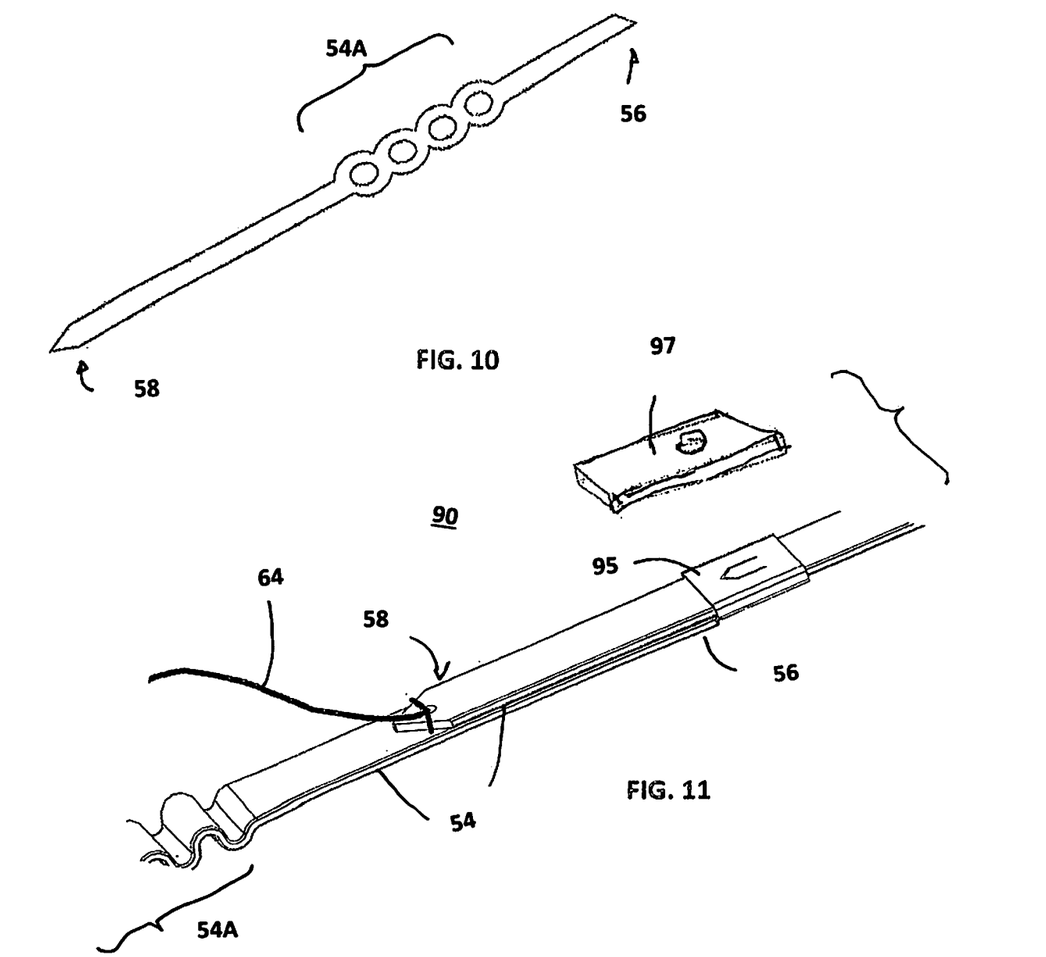
FIG. 10 shows an alternative exemplary resilient spring element adapted for deployment in the band of the "modified cable tie"-like structure of FIGS. 6A-6D.
FIG. 11 shows an exemplary coupling assembly coupling proximal and distal ends of the "modified cable tie"-like structure of FIGS. 6A-6D.

The band 54 is disposed within a surrounding flexible coating 80. The coating 80 may be a polymer, for example, made of PTFE, PEEK, PET, HDPE, polyurethane of other polymer in the range of shore durometer 70 A to 90 A and as hard a shore GOD. The coating can be applied as shrink tubing with an adhesive moisture barrier inner coating so as to adhere and seal to the band 54 when heated and shrunk down. Other means may apply the polymer coating 80 such as injection over-molding, Sheet compression molding or other means to durably cover the band 54 so as to protect bones and ligaments for abrasion. At least one region of the band is characterized as having a shape-memory, being spring-like in the direction of the central axis so that in response to axially-applied tension which axially stretches the coated core 60/80, the coated core 60/80 rapidly returns to its rest length upon cessation of the applied tension. By way of example, FIGS. 9 and 10 illustrate two forms for the metallic shape-memory regions 54A. Each form provides the axial stretching needed for operation. As illustrated in FIGS. 6A-6D, core 54 includes a single region 54A characterized by the above-described shape-memory. The coating 80 is flexible enough so that it flexes with the band 54 allowing axial stretching. In other embodiments, there may be more than one such region.

Figure 8:
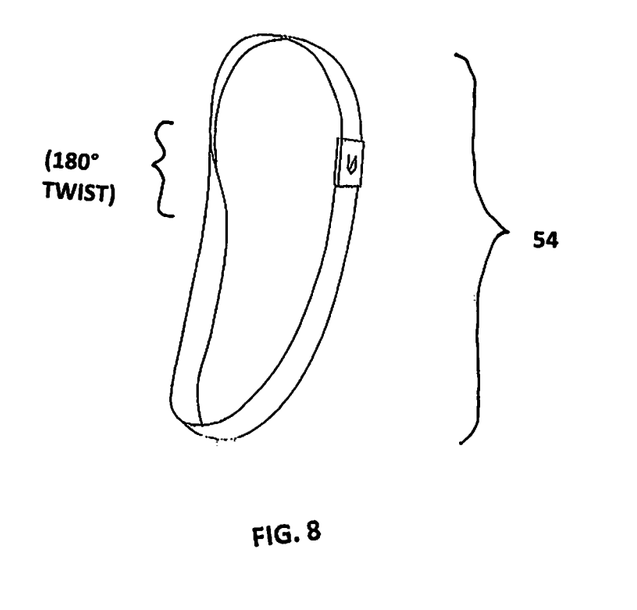
FIG. 8 shows the alternative "modified cable tie"-like structure of FIGS. 6A-6D in a "closed loop" but not deployed about body parts in the damaged shoulder of FIG. 2.

FIG. 7 illustrates utilization of band 54 in a surgical procedure, wherein the band 54 is formed to a closed loop about the clavicle 16 and the coracoid process 28, and is tensioned to position the ruptured ligaments 20, 22 and 24, in mutual alignment so that the ends of the ruptured tendons can be rejoined (preferably by suturing). Moreover, as described below, the tensioned closed loop band 54 has appropriate stretch/resilience to permit small circumferential movement during healing. of particular import, as shown in FIG. 8, the closed loop formed by band 54 includes a single 180° twist so that the "flat" moebius-like ribbon band has surfaces which are angled so that it lies "flat" against both the clavicle 16 and the coracoid process 28, placing the bones and tissues of the shoulder in an optimal position for healing while allowing the patient to "use" the AC joint 8 as it heals.

FIG. 11 illustrates an exemplary latch assembly 90 which joins the proximal end 56 to the distal end 58. As shown, distal end 58 of band 54 overlaps proximal end 56, and the overlapping ends pass (in opposite directions) through a crimp connector 95 which is adapted to mechanically crimp the overlapping ends within the clamp 95. A flexible outer element 97, preferably of the same material as the coating 80, is affixed to the crimp connector to cover any metallic outer surface of the crimp connector 95.

Although the foregoing descriptions of the embodiments of the present technology contains some details for purposes of clarity of understanding, the technology is not limited to the detail provided. There many alternative ways of implementing the technology. The disclosed embodiments are illustrative and not restrictive.

What is claimed is:

1. A joint dislocation reduction device comprising:
an elongated flexible band extending along a central axis from a proximal end to a distal end, and includes:
i. a distal end tapered lead element and an associated distal end coupling element at the distal end, and
ii. an associated proximal end coupling element at the proximal end, wherein the distal end coupling element is adapted to selectively couple to the proximal end coupling element,
the distal end being adapted to receive a cord element extending therefrom to a needle element,
the elongated flexible band being characterized by a shape memory reversibly allowing axial extension and retraction in response to axial tension applied in a predetermined range to the flexible band between the proximal end and the distal end,
the elongated flexible band being adapted to be formed into a closed loop shape:
wherein the elongated flexible band include the cord element and the needle element.

2. A joint dislocation reduction device comprising:
an elongated flexible band extending along a central axis from a proximal end to a distal end, and includes:
i. a distal end tapered lead element and an associated distal end coupling element at the distal end, and
ii. an associated proximal end coupling element at the proximal end, wherein the distal end coupling element is adapted to selectively couple to the proximal end coupling element the distal end being adapted to receive a cord element extending therefrom to a needle element,
the elongated flexible band being characterized by a shape memory reversibly allowing axial extension and retraction in response to axial tension applied in a predetermined range to the flexible band between the proximal end and the distal end,
the elongated flexible band being adapted to be formed into a closed loop shape:
wherein the elongated flexible band include:
i. one or more shape memory regions along the central axis between the proximal end and the distal end characterized by a relatively high elasticity in a direction aligned with the central axis, and
ii. one or more non-shape memory regions along the central axis which are characterized by a relatively low elasticity in a direction aligned with the central axis.

3. The device according to claim 2, wherein the elongated flexible band is composed of metal with a flexible coating.

4. The device according to claim 2, wherein the elongated flexible band when formed into the closed loop shape, has a coupling element that encases overlapping portions of the proximal and distal ends adapted to be crimped so that the elongated flexible band is secured into the closed loop shape.

5. The device according to claim 4, wherein the coupling element band when formed into the closed loop shape with the proximal and distal ends overlapping, includes a gripping portion having teeth adapted for engaging the overlapping portions so that the flexible band is secured into the closed loop shape.

6. The device according to claim 2, wherein the elongated flexible band when formed into the closed loop shape, includes a 1800 twist.

7. The device according to claim 2, wherein at least one of the relatively high elasticity shape memory regions of the elongated flexible band is characterized by a corrugated shape at least in part transverse to the central axis.

8. The device according to claim 2, wherein at least one of the relatively high elasticity shape memory regions of the elongated flexible band is characterized by a zig-zag shape at least in part transverse to the central axis.

9. The device according to claim 2, wherein at least one of the relatively high elasticity shape memory regions of the elongated flexible band is characterized by a succession of a-sections at least in part transverse to the central axis.

10. The device according to claim 2, wherein at least one of the relatively high elasticity shape memory regions of the elongated flexible band is characterized by a single 0-sections at least in part transverse to the central axis.

11. The device according to claim 3, wherein the elongated flexible band is disposed within the flexible coating wherein the flexible coating is a polymer.

12. The device according to claim 11, wherein the flexible coating is a heat shrink polymer tubing with a moisture barrier heat activated adhesive coating on an inside that adheres to the elongated flexible band when heated and shrunk.

13. The device according to claim 11, wherein the flexible polymer coating is an injection over-molded layer with the elongated flexible band encased within.

14. The device according to claim 11, wherein the flexible polymer coating is compression heat molded with layers applied to upper and lower sides and edges of the elongated flexible band.

15. The device according to claim 11, wherein the flexible coating is a liquid polymer that the elongated flexible band is dipped in and then the liquid polymer is allowed to harden.

* * * * *